United States Patent [19]

Bäbler

[11] Patent Number: 6,013,127
[45] Date of Patent: Jan. 11, 2000

[54] PROCESS FOR THE PREPARATION OF QUINACRIDONE SOLID SOLUTIONS

[75] Inventor: Fridolin Bäbler, Hockessin, Del.

[73] Assignee: Ciba Specialty Chemicals Corporation, Tarrytown, N.Y.

[21] Appl. No.: 09/122,553

[22] Filed: Jul. 24, 1998

Related U.S. Application Data

[60] Provisional application No. 60/054,520, Aug. 1, 1997.

[51] Int. Cl.[7] .......................... C09B 48/00; C07D 471/04
[52] U.S. Cl. .............................................. 106/497; 546/49
[58] Field of Search ................................ 106/497; 546/49

[56] References Cited

U.S. PATENT DOCUMENTS

| | | | |
|---|---|---|---|
| 3,160,510 | 12/1964 | Ehrich | 106/288 |
| 3,748,162 | 7/1973 | West | 106/288 |
| 5,093,497 | 3/1992 | Schütze et al. | 546/56 |
| 5,223,624 | 6/1993 | Bäbler et al. | 546/49 |
| 5,229,515 | 7/1993 | Pfenninger et al. | 546/49 |
| 5,502,192 | 3/1996 | Ganci | 546/49 |
| 5,856,488 | 1/1999 | Bäbler | 546/49 |

FOREIGN PATENT DOCUMENTS 1346126  3/1964  France .

*Primary Examiner*—John Kight
*Assistant Examiner*—Charanjit S. Aulakh
*Attorney, Agent, or Firm*—Kevin T. Mansfield; David R. Crichton

[57] ABSTRACT

Solid solutions comprising quinacridone and 6,13-dihydroquinacridone are prepared by oxidation of a finely divided 6,13-dihydroquinacridone salt in an aqueous basic alcoholic medium using hydrogen peroxide as the oxidant. The solid solutions are useful as red organic high performance pigments.

30 Claims, No Drawings

PROCESS FOR THE PREPARATION OF QUINACRIDONE SOLID SOLUTIONS

This application claims priority of provisional application No. 60/054,520, filed Aug. 1, 1997.

SUMMARY

The present invention relates to a new process for the preparation of solid solutions of quinacridone. More particularly it relates to a new process for the preparation of quinacridone solid solutions comprising quinacridone and 6,13-dihydroquinacridone by oxidation of a finely divided 6,13-dihydroquinacridone salt in an aqueous basic alcoholic system using hydrogen peroxide as the oxidant, and the use of the solid solutions as red organic high performance pigments.

BACKGROUND

It is known that under certain conditions, solid solutions of two or more quinacridone pigments having excellent properties can be obtained. Such solid solutions are described for instance in U.S. Pat. Nos. 3,160,510; 3,298,847; 3,647,494 and 3,681,100.

Many processes describe the preparation of quinacridones starting from 6,13-dihydro-quinacridones by oxidation with various oxidants like, for example, nitrobenzene derivatives, such as m-nitrobenzene sulfonic acid sodium salt; selenium; sulfur; iodine; oxygen or air. In another method, quinacridone is obtained by cyclization of 2,5-diphenylamino terephthalic acid in polyphosphoric acid. These processes are not environmentally friendly because they generally require large quantities of organic solvents, strong bases or strong acids. Furthermore, they often employ environmentally unfriendly oxidants which afford large quantities of waste materials, such as the reduced organic by-products.

Copending Application Ser. No. 601017,050 describes an oxidation process for the preparation of quinacridone pigments, including quinacridone solid solutions by (A) premilling the corresponding 6,13-dihydroquinacridone followed by (B) oxidation in an aqueous basic medium with hydrogen peroxide as the oxidant. Although it provides environmental advantages versus the state of the art, this process has the drawback of being a two step process. Thus, it is more difficult to control to obtain a consistent product and it requires expensive milling and synthesis equipment for manufacturing.

The present invention describes a process for the preparation of solid solutions comprising quinacridone, which is also referred to as 5,12-dihydroquino[2,3-b]acridine-7,14dione, a well-known pigment having the formula (I)

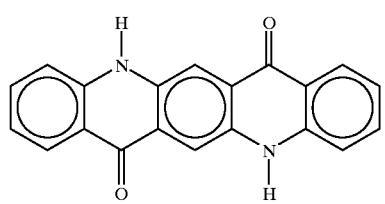

and 6,13-dihydroquinacridone of the formula (II)

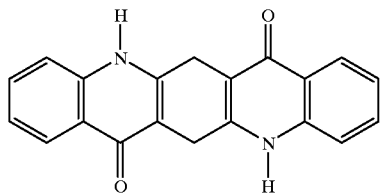

by oxidation of a 6,13-dihydroquinacridone in an aqueous basic alcoholic medium using hydrogen peroxide as the oxidant and the use of the solid solutions as red organic high performance pigments.

Quinacridone is known to exist in three major polymorphic modifications: an alpha form which is disclosed in U.S. Pat. No. 2,844,484, a gamma form which is disclosed in U.S. Pat. No. 2,844,581 and U.S. Pat. No. 2,969,366, and a beta form, which is described in U.S. Pat. Nos. 2,844,485 and 4,857,646. The alpha and gamma polymorphs are red pigments, while the beta polymorph has a violet to magenta hue.

The gamma polymorph itself is known to exist in three forms, a bluish-red gamma-II form which is disclosed in U.S. Pat. No. 2,844,581, and two yellowish-red forms which are designated as the gamma-I and gamma-III forms and disclosed in U.S. Pat. Nos. 3,074,950 and 5,233,624, respectively.

Each of the three gamma forms of quinacridone possesses a distinct x-ray diffraction pattern. The bluish-red gamma-II form shows an x-ray diffraction pattern with three strong lines at 6.6, 13.9 and 26.3; five medium lines at 13.2, 13.4, 23.6, 25.2 and 28.3; and two weak lines at 17.1 and 20.4° 2θ double glancing angles. The yellowish-red gamma-I form shows an x-ray diffraction pattern with three strong lines at 6.6, 13.9 and 26.5; three lines of medium intensity at 13.2, 13.5 and 23.8, and four weak lines at 17.1, 20.5, 25.2 and 28.6° 2θ double glancing angles. The yellowish-red gamma-III form shows an x-ray diffraction pattern with four strong lines at 6.7, 13.3, 14.0 and 26.6; one medium strength line at 13.6 and seven relatively weak lines at 17.2, 20.6, 21.9, 24.0, 25.3, 28.1 and 28.80 2θ double glancing angles.

Several processes are described for the preparation of gamma quinacridone pigments, for example, starting from quinacridone crude by milling, followed by recrystallization in certain organic solvents or by using precipitation processes such as, for example, precipitation from basic DMSO or polyphosphoric acid.

The present invention is based on the discovery that a high chroma quinacridone/-6,13-dihydroquinacridone solid solution having the crystal structure of a gamma-I quinacridone is obtained by oxidation of 6,13-dihydroquinacridone in an aqueous basic alcoholic medium in the presence of a quinone catalyst and using hydrogen peroxide as the oxidant if a special form of a 6,13-dihydroquinacridone salt is generated prior to the addition of the oxidant. It was additionally discovered that a highly saturated and opaque quinacridone/6,13-dihydroquin-acridone solid solution having the crystal structure of a gamma-II quinacridone can be prepared by essentially the same process if a catalytic amount of an aromatic nitro compound is added prior to the addition of the hydrogen peroxide.

Thus, the inventive process is valuable because two different quinacridone high performance pigments having different hues can be made by practically the same environmentally friendly process route.

DETAILED DESCRIPTION

The present invention relates to a process for the preparation of a quinacridone/6,13-dihydroquinacridone solid solution pigment in the gamma-I or gamma-II crystal form, which process comprises
(a) preparing a large particle size 6,13-dihydroquinacridone salt,
(b) converting the large particle size 6,13-dihydroquinacridone salt to a small particle size 6,13-dihydroquinacridone salt,
(c) optionally, adding a catalytically effective amount of an aromatic nitro compound if the gamma-II crystal form is desired,
(d) oxidizing the small particle size 6,13-dihydroquinacridone salt by the addition of hydrogen peroxide in the presence of a catalytically effective amount of a quinone, and
(e) isolating the gamma-I or gamma-II quinacridone/6,13-dihydroquinacridone solid solution pigment.

The 6,13-dihydroquinacridone starting material of formula (II) is well-known in the quinacridone pigments art, as are procedures for its preparation.

The expression "solid solution" is used in this application to mean a pigment composition which has an x-ray diffraction pattern that is different from the sum of the x-ray diffraction patterns of the individual components. Thus, the expression solid solution includes the "guest-host" solid solutions, which have the x-ray diffraction pattern of one of the component pigments, and "solid compounds" or "mixed crystals", which have an x-ray diffraction pattern different from that of any of the individual components and also different from the sum of the x-ray diffraction patterns of the individual components.

In general, the quinacridone/6,13-dihydroquinacridone solid solution in its gamma-I crystal form contains about up to 25 percent by weight of 6,13-dihydroquinacridone, and the quinacridone/6,13-dihydroquinacridone solid solution in its gamma-II crystal form contains about up to 15 percent by weight of 6,13-dihydroquinacridone. The resulting solid solutions have an x-ray diffraction pattern with peaks substantially corresponding to those of gamma-I or gamma-II quinacridone, respectively. However, the location of the peaks may be slightly shifted. Such solid solutions have been described in the literature as solid compounds.

In general, the quinacridone/6,13-dihydroquinacridone solid solution in the gamma-I crystal phase prepared according to this invention contains from about 75 to 95 percent, preferably from 78 to 94 percent and most preferably from 80 to 92 percent by weight, of quinacridone, based on the combined weights of the quinacridone and 6,13-dihydroquinacridone, and 5 to 25 percent, preferably 6 to 22 percent, and most preferably 8 to 20 percent by weight of 6,13-dihydroquinacridone. In contrast to this, the quinacridone/6,13-dihydroquinacridone solid solution in the gamma-II crystal phase prepared according to this invention contains from about 85 to 98 percent, preferably from 90 to 98 percent and most preferably from 93 to 98 percent by weight, of quinacridone based on the combined weights of the quinacridone and 6,13-dihydroquinacridone, and 2 to 15 percent, preferably 2 to 10 percent, and most preferably 2 to 7 percent by weight of 6,13-dihydroquinacridone.

Thus, the present invention relates to a process which provides gamma-I or gamma-II quinacridone in the form of a solid solution, wherein the gamma-I quinacridone/6,13-dihydro-quinacridone solid solution has an x-ray diffraction pattern characterized by strong lines at 6.6±0.2, 13.9±0.2 and 26.5±0.2; medium lines at 13.2±0.2, 13.5±0.2, 23.8±0.2, 25.2±0.2 and 28.6±0.2, and weak lines at 17.1±0.2 and 20.5±0.2 degrees 2θ double glancing angles, where the peaks at 13.2 and 13.5 degrees 2θ double glancing angle can show up as an overlapped peak, and wherein the gamma-II quinacridone/6,13-dihydroquinacridone solid solution has an x-ray diffraction pattern characterized by strong lines at 6.6±0.2, 13.9±0.2 and 26.3±0.2; medium lines at 13.2±0.2, 13.4±0.2, 25.2±0.2, 23.6±0.2 and 28.3±0.2; and weak lines at 17.1±0.2 and 20.4±0.2 degrees 2θ double glancing angles, but where the peaks at 13.2 and 13.4 degrees 2θ double glancing angle often show up as an overlapped peak at 13.3 degrees 2θ double glancing angle.

The quinacridone/6,13-dihydroquinacridone solid solution pigments prepared according to the inventive process are generally polymorphically homogeneous, meaning that the product is substantially free of the other crystalline forms of unsubstituted quinacridone.

Advantageously, the salt of the 6,13-dihydroquinacridone of formula II is a mono- or dialkali metal salt or a mixture thereof. Dialkali metal salts, particularly, the disodium and/or dipotassium salts are preferred, and the most preferred is the disodium salt.

The 6,13-dihydroquinacridone salt is prepared, for example, by stirring the 6,13-dihydro-quinacridone in a basic medium, for example a basic mixture of water and an alcohol, at a temperature above 30° C., preferably 40 to 85° C., and most preferably between 50° and 65° C., for 5 minutes to 3 hours, preferably 20 minutes to 2 hours.

It has been found that the crystalline state of the 6,13-dihydroquinacridone salt has a profound influence on the resulting crystal phase of the quinacridone end product. In the inventive process the 6,13-dihydroquinacridone salt is generated for example, by stirring the 6,13-dihydroquinacridone in a basic medium, for example a basic mixture of water and an alcohol, at a temperature above 30° C., preferably 50–65° C., for 5 minutes to 2½ hours, preferably 20 minutes to 1½ hours, yielding a 6,13-dihydroquinacridone salt having a prismatic shape and a relatively large particle size of up to 25 μm.

The resulting 6,13-dihydroquinacridone salt is activated by the addition of an acid, preferably an inorganic acid, for example hydrochloric or phosphoric acid and most preferably sulfuric acid.

The amount of the acid and its concentration are both important Generally, the acid is added in concentrated form. The amount employed should be sufficient to neutralize only a part of the excess of the base used to generate the mono- or preferably dialkali metal salt of the 6,13-dihydroquinacridone. Advantageously, the reaction mixture is then immediately diluted with 30 to 150, preferably 80 to 130 parts water based on 100 parts by weight of 6,13-dihydro-quinacridone after the addition of the concentrated acid. The resulting reaction mixture is then stirred at 65 to 100° C., preferably at reflux for 30 minutes to 1½ hours. By this procedure the large particle size 6,13-dihydroquinacridone salt is converted to a small particle size 6,13-dihydroquinacridone salt having a particle size of around 0.05 to 2 μm.

Any base capable of forming a salt of the 6,13-dihydroquinacridone is useful in the reaction medium. Preferably, the base is an alkali metal hydroxide such as potassium or sodium hydroxide or a mixture thereof. Most preferably the base is sodium hydroxide.

The molar ratio of the base to 6,13-dihydroquinacridone is preferably from 2.2 to 4 moles of base per mole of the 6,13-dihydroquinacridone. Advantageously, the reaction medium contains 2.3 to 3 moles of base per mole of the 6,13-dihydroquinacridone.

The concentrated acid, preferably sulfuric acid, is employed in an amount that is sufficient to neutralize at least 20% of the base initially present. Preferably, it is employed in an amount that is at least sufficient to neutralize any excess of base beyond 2 moles base per mole of the 6,13-dihydroquinacridone. Advantageously, it is employed in an amount sufficient to adjust the amount of base to between 1.5 and 2 moles of base per mole of the 6,13-dihydroquinacridone.

The generation and the activation of the 6,13-dihydroquinacridone salt is easily observable. The transformation can be readily followed under a light microscope by the formation and change of the crystal shape and size of the 6,13-dihydroquinacridone salt crystals.

Generally, the oxidation is carried out in a reaction medium obtained by combining a slurry which consists essentially of the 6,13-dihydroquinacridone, the catalyst(s), the base and a suitable liquid phase, to which an aqueous solution of hydrogen peroxide is added.

In general, a suitable liquid phase is any liquid medium which promotes the oxidation reaction, and which does not react to a significant extent with the hydrogen peroxide oxidizing agent.

Advantageously, the liquid phase is a mixture of an alcohol and water which contains 150 to 500 parts, preferably 200 to 350 parts of water, and 250 to 750 parts, preferably 300 to 600 parts of the alcohol per 100 parts 6,13-dihydroquinacridone; parts being parts by weight, as the liquid phase.

The alcohol is preferably a lower alcohol, for example, a $C_1$–$C_3$ alkanol, especially methanol. The reaction medium is preferably substantially free of other organic solvents. However, organic solvents are tolerated in the reaction medium as long as they do not impair the 6,13-dihydroquinacridone salt generation or the oxidation reaction.

For safety reasons and to avoid potential side reactions as well as for a more controllable process, the oxidation reaction is preferably carried out under an inert gas flow, for example a nitrogen flow.

In a preferred process, the oxidation to the gamma-I or gamma-II quinacridone/6,13-dihydroquinacridone solid solution is carried out by adding an aqueous solution of the hydrogen peroxide oxidant to a slurry of the 6,13-dihydroquinacridone in a basic mixture of aqueous alcohol and catalysts over a time interval of from 5 minutes to 8 hours at elevated temperatures, preferably over 30 minutes to 6 hours at a temperature of from 60–110° C., preferably from 70–110° C. and most preferably at a reflux temperature within that range, and subsequently maintaining the reaction medium at an elevated temperature with stirring for a period of time to complete the oxidation and promote pigment recrystallization. Preferably, the reaction medium is maintained at a temperature of 50° C. or above, preferably from 70–110° C. and most preferably at a reflux temperature within that range, for from 5 minutes to 5 hours, preferably 10 minutes to 2 hours, after the addition of the hydrogen peroxide. The pigment is then isolated by filtration, washing with an alcohol or hot water and drying. The base and the alcohol can be easily regenerated from the filtrate. Advantageously the same alcohol is used in the reaction medium and for the washing.

The aqueous solution of hydrogen peroxide generally contains from 1 to 50 weight percent, preferably 5 to 30 weight percent, and most preferably 10 to 25 weight percent, of hydrogen peroxide.

The oxidation of the 6,13-dihydroquinacridone salt to the corresponding quinacridone/-6,13-dihydroquinacridone solid solution by hydrogen peroxide is visually followed by the color change of the reaction mixture from gray to red.

Advantageously, a small excess of the hydrogen peroxide is used. The molar ratio is, for example, preferably 1.1 to 5 moles, more preferably 1.2 to 3.5 moles, of hydrogen peroxide per mole of the 6,13-dihydroquinacridone.

The presence of an oxidation-promoting amount of a catalyst during the oxidation step leads to a higher yield of quinacridone. Additionally, the presence of the catalyst under the oxidation conditions described above results in a quinacridone product that is substantially free of quinacridonequinone. Typically the quinacridone solid solution product contains less than 2.5 percent by weight of quinacridonequinone. However, a minor amount of quinacridonequinone is tolerated in the product as long as its presence does not substantially reduce the saturation of the final quinacridone pigment.

Any compound capable of catalyzing the oxidation of 6,13-dihydroquinacridone under the present reaction conditions can be utilized as the catalyst Particularly suitable catalysts for use in the inventive process are, for example, the quinone compounds used for the air oxidation of 6,13-dihydroquinacridone to quinacridone. Such quinone catalysts are well-known in the art. In particular, suitable catalysts include anthraquinone compounds, especially anthraquinone, and anthraquinone sulfonic acid derivatives such as anthraquinone-2,6-disulfonic acid or, preferably, anthraquinone-2-sulfonic acid, or salts thereof, in particular the sodium or potassium salts. The sodium or potassium salt of anthraquinone-2-sulfonic acid is especially preferred. The quinone catalyst is present in the reaction medium in an amount which is effective to catalyze the oxidation reaction, for example from 0.005 to 0.1 times the weight of 6,13-dihydro-quinacridone, and most preferably from 0.01 to 0.05 times the weight of 6,13-dihydroquin-acridone.

Unexpectedly, it was discovered that an aromatic nitro compound such as nitrobenzene or a derivative thereof, for example nitrophenols, nitrobenzoic acids and especially nitrobenzene sulfonic acids, or salts thereof, in particular m-nitrobenzene sulfonic acid, can act as a catalyst and, when used in combination with a quinone catalyst, can enhance the yield of the quinacridone.

Surprisingly, the presence of the aromatic nitro compound also directs the crystal phase of the resulting quinacridone/6,13-dihydroquinacridone solid solution into a gamma-II form.

The aromatic nitro compound should be present in the reaction medium in an amount which is effective to induce the transformation to the gamma-II form of quinacridone, for example from 0.004 to 0.04 times the weight of 6,13-dihydroquinacridone, and most preferably 0.01 to 0.03 times the weight of 6,13-dihydroquinacridone.

After the addition of the aromatic nitro compound and prior to the addition of the quinone catalyst and the hydrogen peroxide, the reaction medium is advantageously stirred under reflux for 3 to 15 minutes, especially 5 to 10 minutes.

Without limiting this invention to any particular theory, it is believed that the aromatic nitro compound oxidizes a small amount of the 6,13-dihydroquinacridone, yielding gamma-II quinacridone crystals which can act as seed crystals during the continuous oxidation by gradual addition of hydrogen peroxide. It is also believed that the quinone catalyst acts to oxidize the 6,13-dihydroquinacridone and is itself reduced to the corresponding leuco compound, which is then regenerated by the hydrogen peroxide.

Depending on the composition of the liquid phase, the recrystallization time and temperature, transparent smaller particle size or opaque larger particle size quinacridone pigments are generated. Lower temperatures and shorter times favor a smaller particle size transparent product, while higher temperatures and longer times favor a larger particle size more opaque product In this regard, an aqueous base, preferably sodium hydroxide, can advantageously be added to the reaction mixture continuously during the addition of the oxidant or immediately after completion of the addition to favor in particular the formation of the inventive gamma-I or gamma-II quinacridone solid solution in an especially high degree of cristallinity or in larger particle size opaque forms. The amount of added base is preferably 0.1 to 1.0 mole per mole of the 6,13-dihydroquinacridone salt.

Additionally, the addition of a particle growth inhibitor before or after the 6,13-dihydro-quinacridone salt generation at step (a) or step (b) to control the particle size of the oxidized quinacridone/6,13-dihydroquinacridone solid solution pigment is tolerated as long as it does not impair the generation of the quinacridone/6,13-dihydroquinacridone solid solution in its gamma-I or gamma-II crystal form, respectively, or the oxidation reaction.

Particle growth inhibitors, also known as antiflocculating or rheology-improving agents, are well known. Suitable particle growth inhibitors include, for example, phthalimidomethyl-quinacridone, imidazolylmethylquinacridone, pyrazolylmethylquinacridone, quinacridone sulfonic acid and its salts, for example the aluminum salt, or 1,4-diketo-3,6-diphenylpyrrolo[3,4-c]pyrrole sulfonic acid and its salts.

To achieve an optimum effect, the particle growth inhibitor is added in an amount of 0.05 to 8%, preferably 0.1 to 5% based on 6,13-dihydroquinacridone, preferably before the 6,13-dihydroquinacridone salt formation.

Furthermore, the presence of other substituted quinacridones, for example, 2,9- or 4,11-dichloroquinacridone, 2,9-dimethylquinacridone or 2,9-dimethoxyquinacridone can be tolerated as long they do not impair the formation of the quinacridone/6,13-dihydroquinacridone solid solution in its gamma-I or gamma-II crystal form, respectively. Preferably the substituted quinacridones are generated from the corresponding 6,13-dihydroquinacridone derivatives. They are preferably added at the beginning of the process, i.e. prior to the 6,13-dihydroquin-acridone salt formation at step (a).

Since the 6,13-dihydroquinacridone salt generation and the oxidation reaction are advantageously carried out sequentially in the same vessel, practically no handling losses occur. Thus, the process according to this invention provides a quinacridone product in a high yield.

In spite of being carried out in a heterogeneous reaction medium, the inventive process provides quinacridone pigments with a narrow particle size distribution. Due to their high purity and desirably narrow particle size distribution, the quinacridone pigments obtained manifest outstanding pigment properties, such as, for example, a high chroma.

Surprisingly, despite the presence of the uncolored 6,13-dihydroquinacridone, the inventive quinacridone/6,13-dihydroquinacridone solid solutions manifest a high color strength, and particularly a highly saturated, attractive masstone color. Additionally, they show outstanding heat, light and weather stability.

Depending on the end use, it may be advantageous to add texture improving agents and/or rheology improving agents, for example before the isolation of the pigment, preferably by blending into the aqueous presscake. Suitable texture improving agents are, in particular, fatty acids of not less than 18 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecane-1,2-diol, and also modified colophonium/maleate resins or fumaric acid/colophonium resins or polymeric dispersants. The use of such texture improving agents with quinacridone pigments is well known. These texture improving agents are preferably added in amounts of 0.1 to 30% by weight, most preferably of 2 to 15% by weight, based on the final product.

Suitable rheology improving agents are for example the above mentioned antiflocculating agents, which are added preferably in amounts of 2 to 10% by weight, most preferably of 3 to 8% by weight, based on the final product.

The present quinacridone solid solution pigments are suitable as coloring matter for inorganic or organic substrates alone or in the presence of other organic or inorganic pigments or coloring agents. They are highly suitable for coloring high molecular weight materials which can be processed to cast and molded articles or which are used in ink and coating compositions such as solvent or water-based coatings, for example automotive coatings.

Suitable high molecular weight organic materials include thermoplastics, thermoset plastics or elastomers, for example, cellulose ethers; cellulose esters such as ethyl cellulose; linear or crosslinked polyurethanes; linear, crosslinked or unsaturated polyesters; polycarbonates; polyolefins such as polyethylene, polypropylene, polybutylene or poly-4-methylpent-1-ene; polystyrene; polysulfones; polyamides; polycycloamides; polyimides; polyethers; polyether ketones such as polyphenylene oxides; and also poly-p-xylene; polyvinyl halides such as polyvinyl chloride, polyvinylidene chloride, polyvinylidene fluoride or polytetrafluoroethylene; acrylic polymers such as polyacrylates, polymethacrylates or polyacrylonitrile; rubber; silicone polymers; phenol/formaldehyde resins; melamine/-formaldehyde resins; urea/formaldehyde resins; epoxy resins; styrene butadiene rubber; acrylonitrile-butadiene rubber or chloroprene rubber; singly or in mixtures.

Generally, the pigments are used in an effective pigmenting amount, for example, of 0.01 to 30% by weight, preferably 0.1 to 10% by weight, based on the weight of the high molecular weight organic material to be pigmented. Thus, the present invention also relates to a pigmented plastic composition which comprises a plastic material and an effective pigmenting amount of a pigment or pigment solid solution prepared according to a process of the present invention, and to a process for preparing said pigmented plastic compositions.

The present pigments are easily dispersible and can be readily incorporated into organic matrixes to provide homogenous colorations possessing high saturation and excellent light and weather fastness properties.

The high molecular weight organic materials are pigmented with the pigments of the present invention by mixing the pigments, if desired in the form of a masterbatch, into substrates using high shear techniques including roll mills or a mixing or grinding apparatus. The pigmented material is then brought into the desired final form by known methods, such as calendering, pressing, extruding, brushing, casting or injection molding.

The following examples describe certain embodiments of this invention, but the invention is not limited thereto. In these examples all parts given are by weight unless otherwise indicated. The x-ray diffraction patterns are measured on a RIGAKU GEIGERFLEX diffractometer type D/MaxII v BX.

EXAMPLE 1

A one liter flask, equipped with thermometer, stirrer, condenser and gas inlet tube is charged with 50.0 grams 6,13-dihydroquinacridone and 250 ml methanol. Nitrogen is slowly introduced to the stirred mixture via a gas flow outlet positioned well above the reaction mixture. Then 29.8 grams 50% sodium hydroxide are added, followed by heating to 50 to 55° C. The gray suspension is stirred at 50 to 55° C. for one hour, yielding a 6,13-dihydroquinacridone salt with a particle size of up to 25 μm. Then 5.0 grams concentrated (96%) sulfuric acid are added to the stirred suspension, followed by 40 ml water. The mixture is heated to reflux and stirred for one hour at reflux, resulting in a 6,13-dihydroquinacridone salt having a particle size of around 0.02 to 2 μm.

Then 0.5 grams of anthraquinone-2-sulfonic acid sodium salt are added into the reaction mixture.

A 150 ml beaker is charged with 44.0 grams 35% hydrogen peroxide and 40 ml cold water, resulting in 84 grams 18.33% aqueous hydrogen peroxide solution. The hydrogen peroxide solution is transferred from the beaker to the stirred reaction mixture in the flask, which is under reflux and nitrogen flow, using a Cole-Parmer Masterflex® peristaltic pump, with tubing type 6404-14, at a pumping rate of 0.3 ml/minute.

The total transfer time for the hydrogen peroxide is around 3 hours and 50 minutes. The 6,13-dihydroquinacridone is oxidized continuously. The oxidation is practically complete at the end of the hydrogen peroxide addition. The reaction mixture is thick in the beginning but easily stirrable. Generally, the suspension gets thinner as a function of time. No foaming is observed, even where the hydrogen peroxide hits the reaction mixture.

The pigment suspension is stirred at reflux under nitrogen flow for another 10 minutes. Then it is diluted with 70 ml cold water and vacuum filtered hot. The press cake is washed with 5 liters of hot water to a pH of 8.0 to 8.5. The filtration and washing is relatively fast The product is dried over night in an oven at 90° C. yielding 48.8 grams red pigment An analytical evaluation of the red quinacridone pigment by spectrophotometric methods shows a quinacridone content of 79% and a 6,13-dihydroquinacridone content of 21%. The x-ray diffraction pattern, which displays the pattern of a gamma-I quinacridone, with no peaks of the 6,13-dihydroquinacridone present, is characterized by the following diffraction lines:

| scattering angle 2θ | relative intensity % |
|---|---|
| 6.84 | 92 |
| 13.35 | 57 |
| 13.70 | 60 |
| 14.16 | 82 |
| 17.36 | 16 |
| 20.63 | 19 |
| 23.84 | 23 |
| 25.45 | 26 |
| 26.49 | 100 |
| 28.68 | 24 |

By rubout according to ASTM method D-387-60 in a lithographic varnish, the pigment shows an opaque yellowish-red masstone and a strong red color in $TiO_2$ extension. When incorporated into plastics or paints, the pigment imparts a yellowish-red color with excellent fastness properties.

EXAMPLE 2

A one liter flask, equipped with thermometer, stirrer, condenser and gas inlet tube is charged with 50.0 grams 6,13-dihydroquinacridone and 250 ml methanol. To the stirred mixture nitrogen is slowly introduced with the gas flow outlet well above the reaction mixture; then 29.8 grams 50% sodium hydroxide are added, followed by heating to 50 to 55° C. The gray suspension is stirred at 50 to 55° C. for one hour, yielding a 6,13-dihydroquinacddone salt with a particle size of up to 25 μm. Then 5.0 grams concentrated sulfuric acid are added followed by 40 ml water. The mixture is heated to reflux and stirred for one hour at reflux, resulting in a 6,13-dihydroquinacridone salt having a particle size of around 0.02 to 2 μm.

One gram m-nitrobenzenesulfonic acid, sodium salt is added, the reaction mixture is stirred for 5 minutes at reflux, followed by the addition of 0.5 grams of anthraquinone-2-sulfonic acid, sodium salt.

A 150 ml beaker is charged with 44.0 grams 35% hydrogen peroxide and 40 ml cold water, resulting in 84 grams 18.33% aqueous hydrogen peroxide solution. The hydrogen peroxide solution is transferred from the beaker to the stirred reaction mixture in the flask, which is under reflux and nitrogen flow, using a Cole-Parmer Masterflex® peristaltic pump, with tubing type 6404-14, at a pumping rate of 0.3 ml/minute.

The total transfer time of the hydrogen peroxide is around 3 hours and 50 minutes. The 6,13-dihydroquinacridone is oxidized continuously. The oxidation is practically complete at the end of the hydrogen peroxide addition. The reaction mixture is thick in the beginning but easily stirrable. Generally, the suspension gets thinner as a function of time. No foaming is observed, even where the hydrogen peroxide hits the reaction mixture.

The pigment suspension is stirred at reflux under nitrogen flow for another 10 minutes. It is then diluted with 70 ml cold water and vacuum filtered hot. The press cake is washed with 5 liters of hot water to a pH of 8.0 to 8.5. The filtration and washing is relatively fast The product is dried over night in an oven at 90° C. yielding 48.8 grams red pigment An analytical evaluation of the red quinacridone pigment by spectrophotometric methods shows a quinacridone content of 94.6%, a 6,13-dihydroquinacridone content of 5.3% and a quinacridonequinone content of 0.1%. The x-ray diffraction pattern displays the characteristic pattern of a gamma-II quinacridone, with no peaks of the 6,13-dihydroquinacridone present. It is characterized by the following diffraction lines:

| scattering angle degrees 2θ | relative intensity % |
|---|---|
| 6.54 | 100 |
| 13.24(overlapped) | 66 |
| 13.86 | 86 |
| 17.15 | 13 |
| 20.32 | 16 |
| 23.56 | 22 |
| 25.18 | 26 |
| 26.23 | 92 |
| 28.31 | 23 |

By rubout according to ASTM method D-387-60 in a lithographic varnish, the pigment shows an opaque bluish-red masstone and a strong red color in $TiO_2$ extension. When incorporated into plastics or paints, the pigment imparts a bluish-red color with excellent fastness properties.

EXAMPLE 3

This Example illustrates the incorporation of the quinacridone/6,13-dihydroquinacridone solid solution in its gamma-II crystal form, obtained according to Example 2, into an automotive paint system.

millbase formulation

The following ingredients are added into ½ pint jar containing, as dispersion medium, 980 grams 5/32 inch rods:

66.0 grams of acrylourethane resin 14.5 grams of AB-dispersant, 58.1 grams of SOLVESSO 100, and 26.4 grams quinacridone/6,13-dihydroquinacridone solid solution obtained according to Example 2.

The pigment is dispersed by rolling the above mixture for 64 hours. The pigment dispersion is separated from the dispersion media providing a homogenous "millbase dispersion" containing 16.0% quinacridone pigment solid solution having a total solids content of 48.0%, and a pigment to binder ratio of 0.5.

EXAMPLE 3A 47.3 grams of the above millbase, 36.4 grams of a solution containing a melamine resin catalyst, a non-aqueous dispersion resin, a UV absorber, and 16.3 grams of a resin solution containing a polyester urethane resin are mixed and diluted with a solvent mixture containing 76 parts xylene, 21 parts butanol and 3 parts methanol to a spray viscosity of 20–22 seconds as measured by a #2 Fisher Cup.

The red resin/pigment dispersion is sprayed onto a panel twice at 1.5 minute intervals as basecoat. After 2 minutes, clearcoat resin is sprayed twice at 1.5 minute intervals onto the basecoat. The sprayed panel is then flashed with air in a flash cabinet for 10 minutes and then "baked" in an oven at 250° F. (121° C.) for 30 minutes, yielding a high chroma bluish-red colored panel with excellent weatherability.

EXAMPLE 3B tint color white base

A $TiO_2$ dispersion is prepared by mixing the following ingredients in a quart can:

604.1 grams of a $TiO_2$ pigment, 129.8 grams of acrylourethane resin, and 161.1 grams of SOLVESSO 100.

1 pint of ½ inch ceramic balls are then added. The dispersion is then milled for 24 hours. The white pigment dispersion is separated from the balls yielding a "$TiO_2$ dispersion" containing 67.5% pigment with a total solids content of 77.4%.

A 10/90 tint shade is prepared by mixing the following ingredients: 15.7 grams mill base, 33.4 grams white base, 20.0 grams of resin solution containing a melamine resin catalyst, a non-aqueous dispersion resin, a UV absorber and 30.9 grams of a resin solution containing a polyester urethane resin. The paint contains 25.1% pigment with a pigment/binder ratio of 0.7 and a total non-volatile content of 60.9%.

The red pigment/$TiO_2$/resin dispersion is sprayed onto a panel followed by a clearcoat as described in Example 3A, yielding a high gloss red tinted panel with excellent weatherability.

EXAMPLE 4

This Example illustrates the incorporation of the quinacridone/6,13-dihydroquinacridone solid solution pigment into a PVC sheet.

63.0 Grams of polyvinylchloride, 3.0 grams epoxidized soy bean oil (PARAPLEX G-62 from The C.P. Hall Company), 2.0 grams of barium/cadmium heat stabilizer, 32.0 grams dioctyl phthalate and 1.0 gram of the quinacridone/6,13-dihyroquinacridone solid solution in its gamma-I crystal phase, prepared according to Example 1, are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2 by constant folding, removal and feeding. The resulting soft PVC sheet is colored in an attractive yellowish-red shade with excellent fastness to heat, light and migration.

A PVC sheet having a bluish-red colored shade is achieved following the same procedure; however, using the quinacridone/6,13-dihyroquinacridone solid solution pigment in its gamma-II crystal phase obtained according to Example 2.

EXAMPLE 5

This Example illustrates the incorporation of a quinacridone/6,13-dihydroquinacridone solid solution pigment into HDPE.

Five grams of the quinacridone/6,13-dihyroquinacridone solid solution pigment in its gamma-I crystal form prepared according to Example 1, 2.5 grams hindered amine light stabilizer, 1.0 gram benzotriazole UV absorber, 1.0 gram hindered phenol antioxidant and 1.0 gram phosphite process stabilizer, all from the Additives Division of CIBA Specialty Chemicals Corporation, are mixed together with 1000 grams of high density polyethylene from U.S.I. QUANTUM Chemicals at a speed of 175–200 rpm for 30 seconds after flux. The fluxed pigmented resin is chopped up while warm and malleable, and then fed through a granulator. The resulting granules are molded on an injection molder with a 5 minutes dwell time and a 30 second cycle time at temperatures of 204, 260 and 316° C. Homogeneously colored chips are obtained which show a bright yellowish-red color with similar color shades at each of the temperatures and with an excellent light stability.

HDPE chips having a bluish-red colored shade and equally good light and heat stability are obtained following the same procedure; however, using the quinacridone/6,13-dihyroquin-acridone solid solution pigment in its gamma-II crystal phase obtained according to Example 2.

EXAMPLE 6

This Example illustrates the incorporation of the quinacridone/6,13-dihydroquinacridone solid solution pigment in its gamma-II crystal form into polypropylene fibers.

1000 Grams of polypropylene granules (DAPLEN PT-55®, from Chemie Linz) and 10 grams of the quinacridone/6,13-dihyroquinacridone solid solution pigment obtained in Example 2 are thoroughly mixed in a mixing drum. The granules so obtained are melt spun at 260–285° C. to afford red filaments of good light fastness and textile fiber properties.

I claim:

1. A process for the preparation of a quinacridone/6,13-dihydroquinacridone solid solution in the gamma-I or gamma-II crystal form of quinacridone comprising quinacridone of the formula (I)

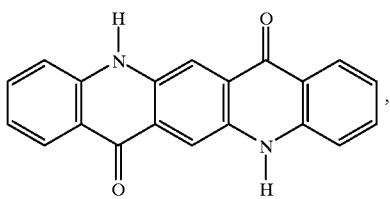

and 6,13-dihydroquinacridone of the formula (II)

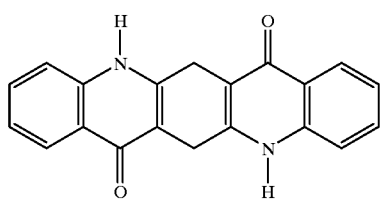

which comprises
(a) preparing a large particle size 6,13-dihydroquinacridone salt,
(b) converting the large particle size 6,13-dihydroquinacridone salt to a small particle size 6,13-dihydroquinacridone salt,
(c) optionally, adding a catalytically effective amount of an aromatic nitro compound if the gamma-II crystal form is desired,
(d) oxidizing the small particle size 6,13-dihydroquinacridone salt by the addition of hydrogen peroxide in the presence of a catalytically effective amount of a quinone catalyst and a liquid phase comprising a $C_1$ to $C_3$ alcohol, and
(e) isolating the gamma-I or gamma-II quinacridone/6,13-dihydroquinacridone solid solution pigment.

2. A process of claim 1, wherein said quinacridone/6,13-dihydroquinacridone solid solution has the crystal phase of a gamma-I quinacridone.

3. A process of claim 2, wherein said quinacridone/6,13-dihydroquinacridone solid solution consists of 80 to 92 percent of quinacridone and 8 to 20 percent of 6,13-dihydroquinacridone based on the combined weights of the quinacridone and 6,13-dihydroquinacridone.

4. A process of claim 1, wherein said quinacridone/6,13-dihydroquinacridone solid solution has the crystal phase of a gamma-II quinacridone.

5. A process of claim 4, wherein said quinacridone/6,13-dihydroquinacridone solid solution consists of 93 to 98 percent of quinacridone and 2 to 7 percent of 6,13-dihydroquinacridone based on the combined weights of the quinacridone and 6,13-dihydroquinacridone.

6. A process of claim 1, wherein the 6,13-dihydroquinacridone salt is a mono- or dialkali metal salt.

7. A process of claim 6, wherein the 6,13-dihydroquinacridone salt is the disodium salt.

8. A process of claim 1, wherein from 2.2 to 4 moles of an alkali metal hydroxide are utilized per mole of the 6,13-dihydroquin-acridone to prepare the large particle size 6,13-dihydroquin-acridone salt.

9. A process of claim 8, wherein from 2.3 to 3 moles of sodium hydroxide are utilized per mole of the 6,13-dihydroquinacridone.

10. A process of claim 1, wherein the large particle size 6,13-dihydroquinacridone salt has a particle size of up to 25 μm and the converted small particle size 6,13-dihydroquinacridone salt has a particle size of around 0.05 to 2 μm.

11. A process of claim 1, wherein the 6,13-dihydroquinacridone salt is converted from a large particle size 6,13-dihydroquinacridone salt to a small particle size 6,13-dihydroquinacridone salt by the addition of an acid.

12. A process of claim 11, wherein said acid is concentrated sulfuric acid.

13. A process of claim 1, wherein the oxidation step is carried out by combining a slurry comprising the 6,13-dihydroquinacrdone salt, the quinone catalyst, the aromatic nitro compound if present, the base and a liquid phase, with an aqueous solution of hydrogen peroxide at a temperature from 60–110° C.

14. A process of claim 13, wherein the liquid phase consists essentially of from about 150 to 500 parts by weight of water and from about 250 to 750 parts by weight of a lower alcohol per 100 parts by weight of 6,13-dihydroquinacridone.

15. A process of claim 14, wherein the liquid phase consists essentially of from 200 to 350 parts by weight of water and from 300 to 600 parts by weight of the alcohol per 100 parts by weight of 6,13-dihydroquinacridone.

16. A process of claim 14, wherein the lower alcohol is a $C_1$ to $C_3$ alcohol.

17. A process of claim 16, wherein the alcohol is methanol.

18. A process of claim 1, wherein the quinone catalyst is selected from the group consisting of anthraquinone, anthraquinone monosulfonic acid and anthraquinone disulfonic acid, or a salt thereof.

19. A process of claim 18, wherein the catalyst is anthraquinone-2-sulfonic acid, sodium or potassium salt.

20. A process of claim 1, wherein the quinone catalyst is present in an amount of from 0.005 to 0.1 times the weight of the 6,13-dihydroquinacridone.

21. A process of claim 13, wherein the oxidation step is carried out with a 5 to 30 percent by weight aqueous solution of hydrogen peroxide.

22. A process of claim 13, wherein 1.1 to 5 moles of the hydrogen peroxide are combined per mole of 6,13-dihydroquinacridone.

23. A process of claim 13, wherein the aqueous solution of hydrogen peroxide is added to the slurry over a time interval of from 5 minutes to 8 hours at a temperature of from 60–110° C. and the reaction medium is subsequently stirred at an elevated temperature for from 5 minutes to 5 hours.

24. A process of claim 23, wherein the reaction medium is subsequently stirred at a temperature of from 70–110° C. for from 10 minutes to 2 hours.

25. A process of claim 4, wherein an amount of 0.01 to 0.03 times the weight of 6,13-dihydro-quinacridone of an aromatic nitro compound is added prior to the addition of the quinone catalyst and the hydrogen peroxide oxidant.

26. A process of claim 25, wherein the aromatic nitro compound is selected from the group consisting of nitrophenols, nitrobenzoic acids and nitrobenzene mono sulfonic acids, and salts thereof.

27. A process of claim 1, wherein the oxidation step is carried out in the presence of from 0.05 to 8% by weight based on the 6,13-dihydroquinacridone of a particle growth inhibitor.

28. A process of claim 27, wherein said particle growth inhibitor is phthalimidomethyl-, imidazolylmethyl- or pyrazolylmethyl-quinacridone, quinacridone monosulfonic acid or a salt thereof, or a 1,4-diketo-3,6-diarylpyrrolo[3,4-c]pyrrole sulfonic acid, or a salt thereof.

29. A plastic article which comprises an effective pigmenting amount of a quinacridone/-6,13-dihydroquinacridone solid solution pigment of claim 1 and a plastic material.

30. A coating composition which comprises an effective pigmenting amount of a quinacridone/6,13-dihydroquinacridone solid solution pigment of claim 1 and a vehicle.

* * * * *